United States Patent Office 3,151,985
Patented Oct. 6, 1964

3,151,985
PROCESS FOR PREPARING A SOLUBLE
TEA PRODUCT
Alfred Fobes, Columbus, Ohio, assignor to Afico S.A.,
Lausanne, Switzerland, a corporation of Switzerland
No Drawing. Filed Nov. 3, 1961, Ser. No. 149,883
Claims priority, application Switzerland, Oct. 18, 1961,
12,037/61
16 Claims. (Cl. 99—77)

This invention relates to a new and improved process for preparing a cold water soluble powdered tea extract, and more particularly to the preparation of a powdered tea extract which is easily and completely soluble in water having a temperature ranging between 5 and 15° C. to form a clear aqueous solution which may be chilled to 0° C. without precipitation of any tea solids.

When referring to cold water in the following specification, it is referred to water having a temperature of substantially 5 to 15° C.

Numerous objects and advantages of the present invention will be apparent and are set forth hereafter.

During the production of instant tea, substances of varying solubility in cold water are extracted from the tea leaves. One fraction of extracted solids is immediately soluble in cold water. The second fraction, referred to here as the "tea tannins," is partially or wholly insoluble in cold water. Cold water soluble tea extracts may be produced by separating the second fraction from the cold water soluble fraction, concentrating the cold water soluble fraction and spray drying it. Thus, the insoluble fraction is discarded. In the past, some processes have been devised to solubilize a portion of the tea tannins fraction for recovery by means of alkali sulfites. However, by these processes considerable amounts of foreign matters are introduced into the final product.

This disadvantage is overcome in the present invention by solubilizing said tannins by one or more oxidation reactions.

Preferably use is made of an oxidizing agent selected from the group consisting of oxygen, an oxygen containing gas, an ozone containing gas, and hydrogen peroxide.

The experimental work carried out shows that the oxidation produces a darkening of the tannins. To restore the original tea color, it becomes necessary to bleach the product after oxidation. This is accomplished by using a bleaching agent such as hydrogen peroxide. Hydrogen peroxide is advantageous since its decomposition products, oxygen and water, are non-toxic and do not affect the flavor of the resultant product. Other suitable oxidizing agents such as ozone can also be used as a bleaching agent. Thus, a second feature of this process is the restoration of the original tea color by bleaching the oxidized tea tannins.

Three ways have been developed in order to realize the improved process. Two of these are continuous while the third is performed batchwise. The preferred way includes a packed absorption-reaction column. The batch way uses a stirred or agitation pressure vessel, and a stagewise process feature comprises the use of a stirred autoclave which is fed and discharged continuously. The above mentioned bleaching operation can be accomplished batchwise or continuously in conjunction with any of the said oxidation ways.

The continuous column, batch and stagewise ways will be described in this order in the following specification.

A. CONTINUOUS COLUMN METHOD

A. Continuous Column Method

Raw tannin, obtained from the tea extract after the extraction and concentrated to about 2 to 20%, preferably 8%, is centrifuged. The centrifuged, washed cake is collected by batches, usually at a concentration of 12 to 16% solids, and is standardized, if required, with water to a concentration of 12%. Although standardization to 12% concentration is best for product uniformity, any feed concentration can be used which will permit the feed to exhibit the proper flow characteristics in the packed column. When a batch has been standardized, it is heated to 60–74° C. and pumped into a feed tank. Here it is maintained at a temperature of 60–74° C. and agitated.

Hot, standardized tannin feed is continuously withdrawn from said feed tank through a pump which conveys the feed solution into an oxidation column. The latter operates at a pressure of about 8.5 kg./cm.$^2$. Pressurized tannin feed solution is heated to about 70–107° C. in a preheater. This elevates the tannin temperature to that required for the oxidation reaction. The feed is not heated above 74° C. prior to this point because an excessive darkening of tannin solids would occur.

Immediately after the feed heater a first alkali addition, for example an inorganic hydroxide such as NaOH, is made using a mixing T. The alkali added at this point amounts to 35% of the total alkali addition. (Any fraction of the total amount of alkali could be added.) This amount of alkali is sufficient to raise the pH high enough to initiate the oxidation reaction. Alkali also serves to solubilize the tannins at this point, thus providing a uniform feed solution and preventing solids precipitation in the upper portion of the column packing.

The packed oxidation column consists, functionally, of two portions both of which are packed and located in the same pressure vessel. Different metal or ceramic packings have been used successfully. The upper or absorption section contains packing sufficient to provide about 2.05 m.$^2$ of packing area for every kilogram per hour of solids which passes through. A liquid mass velocity of 535 kg./hr./m.$^2$ is maintained. The corresponding gas mass velocity being 5.2 kg./hr./m.$^2$. These mass velocities are not critical and can vary widely. The hot solution absorbs oxygen primarily in the absorption section although the reaction is initiated and is partially completed in the absorption section.

The lower or reaction section of the column is located immediately below the absorption section. This contains a pool of oxygen-rich tannin solution. This hold-up permits the reaction to proceed to the extent required for solubilization before entering a bleaching column.

The absorption section is provided with cooling coils through which hot water at 71–107° C. is circulated to both remove the heat of reaction and maintain isothermal operating conditions. Other cooling methods such as water jacket or heat exchanger can be used. Approximately 110 kg. cal./kg. net heat of tannin solids feed must be removed by the cooling water.

Oxygen is admitted to the column at the bottom of the hold-up section at a rate which can vary from 30 to 120 litres per kilogram of tannin solids feed. If too little oxygen is used insolubility results; if too much oxygen is used the tannins will darken excessively. The oxygen feed passes through a pressure reducer-regulator and rotameter system before entering the column. Column pressure is maintained by the oxygen pressure.

The oxygen bubbles up through the hold-up liquor, replenishing the solution with oxygen at this point, having been used for the reaction. Upon leaving the hold-up section the gas is used for contacting fresh feed in the absorption section. It should be noted that the gas velocity in the absorption section is very low compared with other absorption reactions. This velocity is in the range of up to 3 metres per minute.

The column is extended above the feed cross and is not packed at this point to provide a disentrainment section. This section serves to separate entrained liquid from the exit gas and to allow for foaming. Exit gas is bled from the system through a metering valve located after a separator. Usually the composition of the exit gas is about 80% oxygen and 20% carbon dioxide. This can vary from 25% to 100% oxygen. A concentration of oxygen above 25% by volume must be maintained in the exit gas to obtain efficient solubilization.

As mentioned previously, 5% sodium hydroxide or the equivalent amount of potassium hydroxide (concentrations even higher than 50% can be used) is added to the reaction mass. While the first 35% is usually added in the feed line before the feed enters the oxidation column, the remaining portion enters at a number of additional inlets on the side of the absorption section of the column. A portion of the remaining sodium hydroxide is added through each inlet.

A pump is used to convey sodium hydroxide to the system, the flow being proportioned by a rotameter-valving system in each inlet line. The total percentage of sodium hydroxide required for the solubilization is 9.5% (pure sodium hydroxide based on tannin feed solids). Addition levels of up to 25% can be used depending upon the degree of solubilization desired.

The level of the hold-up liquor in the oxidation column is controlled by the pumping speed of an intercolumn pump. This pump serves not only for level control, but to isolate the oxidation and bleaching columns. Oxidation and bleaching have also been accomplished in one column. However, it is preferable to execute said operations in separate systems. Sodium hydroxide addition is regulated to produce a pH of about 5.5 to 7.5 at a point place before the intercolumn pump. The oxidation of tea tannins is essentially complete at this point. Some additional solubilization does occur in the bleach cell. This is in addition to the bleaching effect of the peroxide. This additional solublization is dependent upon the solubilization achieved during oxidation.

Hydrogen peroxide is metered into the oxidized tannin stream after the intercolumn rotameter. An addition of up to 50% (pure peroxide based on tannin solids) may be added depending upon the color desired. Actually, addition levels of 10 to 23% have been found adequate. Peroxide concentrations of up to 36% have been used successfully. Higher concentrations of hydrogen peroxide could be used, although from the point of view of safety, it is not desirable.

The liquor leaving the oxidation column is at a temperature of 71–107° C., and it has been found that the addition of peroxide at this temperature promotes rapid decomposition of the peroxide. This reduces the bleaching effectiveness of the peroxide. Therefore, the tannin-peroxide mixture is cooled in a heat exchanger to 60–88° C. before entering the bleaching column.

The liquor holding time in the bleach column may vary from 10 minutes to 2 hours depending upon the bleach development desired. The bleach column operates at a pressure of 6.3 kg./cm.$^2$ which is maintained by regulating the flow through a metering valve. Pressures of 0 to 8.5 kg./cm.$^2$ have been used successfully for bleaching.

The bleached tea tannin liquor leaving the bleach column is at a temperature of about 77–110° C. (Peroxide decomposition is exothermic.) The liquor pH at this point is about 5.5 to 6.5.

Since the bleached product is held in a surge tank prior to the final evaporation step, the liquor temperature to the surge tank must be regulated carefully. This prevents adverse color changes in the surge tank while permitting adequate dissipation of residual peroxide. A heat exchanger is used to cool the liquor to 71–88° C.

Product, solubilized tannins are held in a surge tank containing about one hour of hold-up. Product tannins are continuously fed into and discharged from the surge tank. The holding time is required for dissipation of residual peroxide in the tannin liquor to a point where all the peroxide can be removed during evaporation. Product tannins are recombined with the clarified fraction in the feed line to the evaporator.

Oxidized tea tannins can be bleached continuously in a pressure vessel such as an autoclave equipped with an agitator. In general, such a bleach method is not as satisfactory as the continuous column bleach since considerable backmixing occurs. Thus, the product color is representative of an average bleach value. By the continuous autoclave method, the bleaching agent is added in the line before the autoclave. The tannin-peroxide mixture then continuously enters the pressure vessel where it is held under pressure and agitated for a period of up to two hours. The product is continuously withdrawn from the autoclave and may be collected in an agitated surge tank for further bleach development and peroxide dissipation before blending it with clarified liquor.

Batch bleaching can be employed for bleaching liquor solubilized in the continuous oxidation column. The liquor is merely collected batchwise from the oxidation column and bleached batchwise in a pressure vessel equipped with agitation (description in part B).

With regard to the process for tea manufacture, the extraction of 45.4 kg. of tea leaves results in the production of about 5.4 kg. of tea tannins from the centrifuging operation. Centrifuging results in the separation of the cold water soluble portion from the tea-tannin fraction. About 10 kg. of clarified concentrate are obtained. The concentration is about 5.6%, and the solution weight is about 179.2 kg. The discharged solids from the centrifuge amount to 5.4 kg. and are collected at a concentration of about 14%. (The discharged solids are tea tannins.) The solution weight is 38.5 kg. which includes the wash water used to wash the centrifuge bowls at the time of discharge. This centrifuge cake constitutes the feed for the oxidation process.

The solubilization column feed is prepared by standardizing the discharged solids solution to 12% concentration. As cited, this requires the addition of 6.4 kg. of water, yielding a column feed of 45 kg. of solution at 12% concentration.

The sodium hydroxide (5% concentration) required to process the above quantity of tannins is 10.25 kg. at the 9.5% addition level. This addition is made in the oxidation column so that the product amount from the oxidation column is 55 kg. at a concentration of 10.3%.

This quantity of tea tannins requires 2.75 kg. of hydrogen peroxide at an addition level of 18% for bleaching. Thus, the amount leaving the bleach column is about 58 kg. of product at a concentration of 9.85% (5.7 kg. of tannin solids).

After peroxide dissipation, the 5.7 kg. of tannin solids at 9.85% concentration (58 kg. liquor) is blended with the clarified concentrate solids of 10 kg. at 5.6% concentration (179.2 kg. liquor). The clarified solids to tannin solids ratio is 1.7/1. The resulting evaporator feed amounts to 15.7 kg. of solids or 237.2 kg. of solution (concentration equal to 6.58%). After spray drying, this yields 15.7 kg. of tea powder.

B. BATCH REACTOR METHOD

By the batch method, the reactor is charged with the tea tannin feed and the oxidizing agent and alkali (an inorganic hydroxide) are added as required until the oxidation is complete. As outlined previously, tea tannins darken under this oxidative treatment. Batch oxidized tannins may be bleached by continuous methods or by the batch method. The batch method will be described here.

Said method is accomplished in a pressure vessel equipped with sufficient agitation to yield the gas absorption required. This vessel may be of the autoclave type and equipped with an agitator. A pressure vessel equipped with an eductor or fluid-type mixer may also be used.

The feed is obtained as cake from the centrifuging operation as described under part A. The vessel is charged with sufficient raw tannin liquor feed to fill approximately one-half the reactor volume. This assures sufficient oxygen concentration after pressurizing so that the proper amount of reacting oxygen is present. As an alternative, reaction gases may be bled from the reactor and fresh oxygen supplied to the reactor during the time of reaction.

The charge is agitated at a speed sufficient for securing the proper amount of gas absorption and heated to 71–107° C. Heating and cooling the reactor charge is accomplished by passing steam or tempered water through the reactor jacket. This can also be done by recirculating the charge through an external heat exchanger. The pH is adjusted to 5.5–7.5 by the addition of sodium hydroxide or potassium hydroxide of 25 to 50% concentration.

When the pH reaches the optimum of 6.5, oxygen is admitted to the system and pressure is built to 2.1–14 kg./cm.$^2$ depending upon the desired reaction rate. Since oxygen pressure is used to control reaction pressure, any loss of gas during the reaction such as oxygen absorption is compensated for by the further addition of oxygen. As oxygen is admitted, the reaction will start as shown by a pH reduction. To maintain the reaction, sodium hydroxide must be metered to the system to keep a pH of 5.5–7.5; alkali is added until a total of 8.5 to 9.5% (pure alkali based on feed solids) has been added. Quantities of up to 25% can be used. After this, the reaction mass may be allowed to react for an additional period of time, during which the pH may drop to 5.0–6.5. The reaction time measured from the start of oxygen addition to the end of the sodium hydroxide addition may properly vary from 10 minutes to 3 hours depending upon the reaction temperature, pressure, agitation and concentration of reactants.

During this oxidation, heat must be removed from the reaction mass since the reaction is exothermic. This heat duly amounts to 280 to 560 kg. cal. per kilogram of feed solids.

When processing batchwise, the solubilized tannins are bleached immediately in the same vessel used for oxidation. Generally, the bleaching conditions are the same as used for solubilization, i.e. 2.1–14 kg./cm.$^2$ pressure (bleaching has been done with limited success at atmospheric pressure), 41–107° C. temperature and the same amount of agitation. Some additional solubilization is obtained during the bleaching treatment.

Hydrogen peroxide is normally used as the bleaching agent. From 10 to 22% of 100% hydrogen peroxide (based on solids feed) is required to secure the proper color. Addition levels of 50% can be used. This is added gradually over a 30 minute period. Gases evolved from the decomposition of peroxide may be bled from the reactor during this period to maintain a constant bleaching pressure. This is not an absolute requirement. For isothermal operation, the reactant must be cooled during the bleach treatment. After the desired amount of hydrogen peroxide is added the reaction mass is allowed to remain under pressure and agitated until the pH is reduced to 4.9–5.5. In some cases the pH must be adjusted to 5.0 after the reaction with an acid such as acetic. In other instances, where the pH after bleaching approaches 5.1 to 5.2 no adjustment is necessary.

If continuous bleaching is desired, the solubilization product is removed from the reaction vessel and processed continuously through a bleach column or continuous autoclave system as described in part A.

Considering a material balance for the batch system, for every 45.4 kg. of raw tea there are about 5.4 kg. of tannin solids to be solubilized as outlined in part A. This can be standardized to 12% concentration yielding 45 kg. or about 42.8 l. of solution.

The 45 kg. charge is added to the reactor and agitated while heating to 77° C. The total alkali required to solubilize this charge amounts to 916 gr. of 50% sodium hydroxide at the 8.5% addition level (pure sodium hydroxide based on feed solids). About 40% or 368 gr. is required to adjust the reactor feed to pH 6.5 before pressurizing. After pH adjustment, the reactor is pressurized to 6.3 kg./cm.$^2$, the remaining 60% of the sodium hydroxide being added to maintain a pH of 6.5. When the theoretical quantity of the sodium hydroxide has been added the charge may be allowed to solubilize for an additional 5 to 10 minutes. After solubilization the reactor contains 5.7 kg. of solids to 45.9 kg. of solution at a concentration of 12.33%.

About 15% hydrogen peroxide (pure hydrogen peroxide based on feed solids) or 2.3 kg. of 35% hydrogen peroxide might be sufficient to bleach the solubilized tea tannins. This could be added evenly over a period of one-half hour. At the end of this period, about 48.2 kg. of product would be obtained containing 5.7 kg. of solids at a concentration of 11.8%.

This could be blended with the clarified concentrate in a manner identical with that described for the continuous column system in part A. This would produce 15.7 kg. of tea product after drying.

C. STAGEWISE SOLUBILIZATION METHOD

The stagewise or step method employs one or more reactors arranged in series so that the product of one flows continuously into the feed line of the next. The residence time of the reaction mass in each reactor is controlled to obtain a specified amount of solubilization in each reactor.

As an example, in a two reactor system of the stage wise variety with about 45 minutes hold-up in each reactor about 70% and 88% solubilization could be expected in the first and second stages, respectively. This solubility is sufficient to yield 10° C. cold water solubility in the tea product.

The feed system for a two-stage system is identical with at described for the continuous system in part A up to the point of entry into the first reactor. After preheating to 71–107° C. sufficient sodium hydroxide or potassium hydroxide is added to raise the pH to 5.5–7.5. This feed enters the first reactor where it remains for an average of 45 minutes.

The product from the first reactor is pumped directly into the second reactor where it remains again for 45 minutes. The product on leaving the second reactor may be processed through additional solubilization reactors if desired. If not required, this product is bleached according to the methods described in parts A and B.

Each of these reactors is equipped with sufficient agitation to realize good gas absorption characteristics. They may be operated with from 25 to 75% gas head-space. As before, either jackets or heat exchangers are required for heating and cooling the reaction mass as is necessary.

Since gaseous reaction products are generated during the course of the reaction, the gas in each reactor must be bled from the vessels to maintain the reaction. This is continuously replaced with fresh oxygen. The exit gas from one reactor may be utilized further in another reactor (recycled countercurrently) or each reactor may have its own oxygen source. The removal of exit gases from the reactors requires that each vessel be equipped with a gas-liquid separator. The separators contain small water sprays to scrub entrained foam from the exit gas. Liquid removed from the separators is either recycled to the feed stream of that reactor or that of the next reactor.

Each reactor is equipped with an alkali inlet so that the pH of the reactants can be maintained near the operating level. It might be desirable to operate the last stage with not sodium hydroxide injection, providing the required 8.5 to 9.5% sodium hydroxide in the prior stages. This would permit the pH to decrease sufficiently so that neutralization with acid would not be required after bleaching.

The operating variables for this system are much the same as discussed during the previous parts A and B. Operating pressure should be 2.1–14 kg./cm.$^2$ and the operating temperature can vary from 71–107° C. About 280–560 kg. cal. per kilogram of feed solids total heat must be removed from all stages. About 62.5 l. of oxygen must be made available for reaction per kilogram of initial feed solids.

The material balance for this process follows that of the continuous process. Naturally, the amount of chemicals, including oxygen, added to each stage and residence time in each reactor depends upon the method of operation.

All of the above three processing systems can be operated using hydrogen peroxide, oxygen or an oxygen-ozone stream as the oxidant. Both ozone and hydrogen peroxide can be use satisfactorily as bleaching agents.

*Example I*

When the tea extractors are operated at the rate of 508 kg. of tea leaves per hour, approximately 60.3 kg. of tea tannins per hour are produced. About 430 kg. of tea tannin solution (14% concentration) is received from the centrifuging operation as the discharged centrifuge cake plus the wash water used to rinse the centrifuge at the time of discharge. The clarified concentrate contains approximately 112 kg. of clarified tea solids and is collected at a concentration of about 5.6%. The weight of the clarified solution is thus about 2000 kg. The clarified solution is blended later in the process with the tea tannins after they are solubilized.

Discharged tannin cake is collected in a small surge tank; the solution is standardized to 12% concentration and heated to 71° C. For 430 kg. of 14% centrifuge cake, 72.6 kg. of dilution water must be added per hour in a feed collection tank, resulting in 503.5 kg. of column feed solution at a concentration of 12%. Standardized feed is then pumped to the column feed tank. Column feed is continuously withdrawn from this tank. Contents of the feed tank are maintained at 71° C. by direct steam injection. The feed tannins are agitated to maintain a uniform feed solution.

Feed is withdrawn from the feed tanks and pumped into the top of the oxidation column at the rate of 8.4 kg. per minute. The feed is preheated at 82° C. before entering the column. After the preheater about 670 gm. per hour of 5% sodium hydroxide is injected into the feed steam. The hydroxide-tea tannin solution then enters the column and is distributed on the top of a ⅝″ Pall Ring packing by a conventional cross-type distributor.

As the feed proceeds down over the Pall Ring packing it is contacted with approximately 57 l. per minute of an oxygen-rich gas. After absorption and reaction this gas is exhausted through a separator system at approximately 28 l. per minute. About 8.5 kg./cm.$^2$ pressure is maintained in the column by the oxygen supply pressure. In the absorption section approximately 111 kg. cal. per minute net heat must be removed. This is accomplished using two concentric cooling coils containing approximately 4.65 m.$^2$ of cooling area through which tempered water is recirculated at an entering temperature of 77° C.

As the liquid proceeds down over the packing the pH of the tannin solution is maintained by injecting 5% sodium hydroxide at three points. These are equally spaced and carry alkali at rates of about 476 gr., 381 gr. and 381 gr. per minute, respectively, from top to bottom.

The solubilization process is initiated and partially completed in the absorption section of the column. Due to the exothermic heat of reaction, the liquor reaches a temperature of about 38° C. in the lower portion of the absorption section.

Immediately below the absorption section in the lower portion of the column, the liquor is pooled, maintaining a hold-up at this point of approximately 15 minutes at the column feed rate. This amounts to about 154 kg. of tannin solution. Here the reaction is allowed to be completed. The level of this hold-up liquor is continually monitored and is controlled by the intercolumn pump rate. This pump removes liquor from the bottom of the oxidation column. The pH of the liquor after oxidation is approximately 7.2. Under steady conditions, the liquor leaving the bottom of the column amounts to 10.3 kg. per minute at a concentration of 10.3%. This includes the hydroxide added to the column.

After the intercolumn pump, the oxidation product enters the bleaching system. About 517 gr. per minute of 15% hydrogen peroxide (18% addition level) is added to the oxidized tannin stream. The peroxide tannin mixture is cooled to 74° C. before entering the bleaching column. Said column is maintained at 6.3 kg./cm.$^2$ pressure by controlling the liquid flow thorough the outlet (back-pressure) valve. The hold-up time in this column is approximately 45 minutes. After leaving the bleach column the pH is 6.2. The liquor flow at this point is 10.8 kg. per minute or 650 kg. per hour. This solution is cooled to approximately 82–88° C.

After being cooled, the liquor enters a surge tank from which the feed to the heavy liquor evaporator is withdrawn continuously. An average hold-up of one hour is maintained in this tank or about 635 kg. of liquor. The liquor drawn from the pre-evaporator surge tank is continuously mixed with the clarified concentrate obtained earlier from the centrifuge. This mixture constitutes the feed for the final evaporation operation when blended in the proper proportion.

*Example II*

From the extraction of 508 kg. of raw tea per hour in the tea percolators, approximately 60.5 kg. of tannin solids per hour result. As in the preceding example, this is collected as centrifuge discharge cake at a concentration of 14% (about 430 kg. of solution). This solution is standardized to 12% concentration by the addition of approximately 72 kg. per hour of water. The resulting solution of 503.5 kg. per hour of tea tannin at 12% concentration constitutes the feed for the batch method. After standardization and heating to 77° C., approximately 4.1 kg. of 50% sodium hydroxide is added to the reactor charge to raise the pH to 6.5.

With the solution in the reactor hot and the pH adjusted, oxygen is admitted while agitating violently to promote oxygen absorption. In a reactor, approximately 629 l. of oxygen at 77° C. and 41 kg. pressure would be required. Thus about 3400 l. oxygen must be added to pressurize the vessel.

While pressurizing the reactor, the reaction is initiated as evidenced by a drop in pH. The remaining sodium hydroxide, amounting to about 6.2 kg., is added intermittently to maintain a pH of 6.5 during the pressurization and the remainder of the reaction time until the theoretical amount (8.5% pure hydroxide based on tannin feed solids) has been pumped into the reactor. Once the reaction vessel has been pressurized, oxygen pressure is maintained at 6.3 kg./cm.$^2$ by a pressure regulator.

The exothermic heat of reaction, which amounts to about 25198 kg. cal. (about 418 kg. cal. per kg. of tannin solids) of heat must be removed from the reaction charge during the period of reaction. An indirect, water-cooled, external heat exchanger or a jacket on the reaction vessel may be used for this purpose. The reaction temperature is maintained at 77° C. through the course of the oxidation reaction. The reaction charge will consume approximately 125 l. of oxygen per kg. of feed tannin solids or about 18.75 m.$^3$ of oxygen in this example.

When the theoretical amount of hydroxide has been added and the reaction allowed to proceed towards completion for approximately 25–30 minutes (time from start of pressurization) the oxidation reaction should be essentially complete. The bleaching process is then initiated.

About 26 kg. of 35% hydrogen peroxide is added gradually over a period of 30 minutes to the oxidized tannin charge in the reactor. During this time excess pressure created by the dissociation of the hydrogen peroxide must be bled from the vessel to maintain a constant bleaching pressure of 6.3 kg./cm.$^2$. The pH will be reduced gradually to an end point of approximately 5.3–5.4. At the end of this time the bleaching process is complete and the reactor is depressurized. The bleached, solubilized tannins are then pumped to a product weigh tank where they are agitated for approximately one hour to dissipate excess peroxide. This product batch is then recombined with the clarified concentrate prior to final evaporation as described in Example I.

*Example III*

As in the preceding examples when 508 kg. of raw tea per hour are extracted, approximately 60.5 kg. of tannin solids per hour are obtained. This is collected as centrifuge cake at 14% concentration and standardized to 12%, resulting in a total solution feed of 503.5 kg.

In this example the tea tannins are oxidized by a two-stage continuous reactor system and bleached continuously by the continuous autoclave method.

The tea tannin feed is standardized and preheated to 71° C. as described in Example I. The solution is pumped continuously from the feed tanks to the first-stage reactor. Before entering the reactor the feed is heated to 82° C. in a steam-heated heat exchanger. In addition, the initial alkali charge is added to the feed mixture to bring the pH to 6.5. This amounts to 4.1 kg. per hour of 50% sodium hydroxide and is added using an in-line mixer in the feed line to the first-stage reactor. Thus, the feed tannins at 8.4 kg. per minute are mixed with 68 gr. per minute of 50% sodium hydroxide before entering the first-stage reactor.

The first-stage consists of a pressure autoclave which is fed and discharged continuously. Sufficient agitation is provided to promote good gas absorption characteristics. For instance, an anchor type agitator revolving at the speed of 300 r.p.m. can be used. An alkali addition is made directly into the first-stage reactor. This amounts to 51 gr. of 50% sodium hydroxide per minute.

The first-stage reactor is designed to hold 45 minutes of liquor which amounts to 378 kg. or 380 l. Allowing for 50–60% head space, an autoclave having a total volume of 850 l. could be used properly. With an average residence time of 45 minutes hold-up, 70% tannin solubilization is realized in the product from the first-stage. The first-stage is fed with about 28.3 l. per minute of oxygen. Pressure is maintained at 8.5 kg./cm.$^2$ by providing oxygen as fast as it is absorbed. Tempered water at 77° C. is recirculated through the autoclave jacket (an external heat exchanger may be used) at a rate sufficient to maintain the reactor charge between 77–82° C. Exit gas, containing the reaction products, is bled continuously from the first-stage reactor at the rate of 14 l. per minute. A water spray in the separator removes entrained liquor which is then recirculated back to the feed of the second reactor. The exit gas may be recycled if this is economically desirable.

The product from the first-stage reactor is continuously removed and pumped into the second-stage reactor which is also maintained at 8.5 kg./cm.$^2$. Here an additional 51 gr. per minute of 50% sodium hydroxide is added to the contents of the reactor. This reactor also contains liquor equivalent to 45 minutes hold-up time from which a final solubilization of 88% is realized. About 28.3 l. of oxygen is supplied to this reactor and the exit gas of 14 l. per minute is withdrawn continuously. The operation of the second-stage reactor is identical with that of the first. Tempered water is circulated in the reactor jacket. The product from the second-stage reactor is withdrawn at the rate of 8.6 kg. per minute to a surge tank. At this point the pH is approximately 5.5 and 88% solubilization has been attained. The solution is then bleached.

According to the continuous autoclave method of bleaching the oxidized tannins are pumped into a pressurized reatcor. In the line leading to the reactor the solubilized feed tannins are mixed with hydrogen peroxide. Feeding tea tannins at 8.4 kg. per minute and 12% concentration, about 432 gr. per minute of 35% hydrogen peroxide will be required for a 15% addition level (basis feed solids). The peroxide-tannin mixture enters the autoclave which is maintained at 41 kg. pressure. The pressure is controlled by bleeding the gaseous products of peroxide decomposition from the reactor to the separator system. Geometrically, the bleach reactor is identical with the above oxidation reactors.

The bleaching tannins are held for an average of 45 minutes (residence times as low as 10 minutes are satisfactory) before being withdrawn from the bleach reactor. The product from the bleach reactor is agitated in a surge tank to dissipate peroxide before being mixed with the clarified concentrate as described in Example I prior to the final evaporation.

While illustrative examples have been stated, it is understood that numerous changes, omissions and substitutions can be made in the disclosure herein without departing from the scope of our invention.

What is claimed is:

1. In the process of treating tea to produce a cold water soluble powdered tea extract wherein an initial aqueous tea extract is prepared from tea leaves, and chilled to precipitate a portion of the tea tannins contained in said extract and thus form a clarified extract, the improvement which comprises separating said precipitated tannins from said extract, subjecting said separated tannins to at least one oxidation reaction by means of an oxidizing agent selected from the group consisting of oxygen, an oxygen containing gas, an ozone containing gas, and hydrogen peroxide, said oxidation reaction being performed within a pH range of from about 5.5 to about 7.5 with said pH range being maintained by the addition of suitable amounts of an alkaline solution, the amount of oxidizing agent employed in said oxidation reaction being sufficient to substantially completely oxidize said tea tannins, mixing the resultant solution of oxidized tea tannins with the clarified extract, and drying the resultant mixture to provide a powdered tea extract.

2. A process according to claim 1 in which said initial aqueous tea extract is concentrated before chilling.

3. A process according to claim 1 in which said solution of oxidized tea tannins and said clarified tea extract are concentrated separately before mixing together.

4. A process according to claim 1 in which the resulting mixture of said solution of oxidized tea tannins and clarified tea extract is concentrated before drying.

5. A process according to claim 1 in which said separated tannins are subjected to a first oxidation reaction by means of an oxidizing agent selected from the group consisting of oxygen and an oxygen containing gas, and to a second oxidation reaction by means of an oxidizing agent selected from the group consisting of ozone, an ozone containing gas, and hydrogen peroxide.

6. In a process for preparing an improved cold water soluble powdered tea extract wherein an initial aqueous tea extract is prepared, volatile aromatic stripped from said aqueous extract, said volatile aromatics being condensed separately from the stripped residue of said initial aqueous tea extract, and wherein said stripped aqueous tea extract is chilled in order to precipitate a portion of tea tannins contained in said extract, the improvement which comprises, separating said precipitated tannins from said extract, subjecting said separated tannins to at least one oxidation reaction by means of an oxidizing agent selected from the group consisting of oxygen, an oxygen containing gas, an ozone containing gas, and hydrogen peroxide, said oxidation reaction being performed within a pH range of from about 5.5 to about 7.5 with said pH range being maintained by the addition of suitable amounts of an alkaline solution, sufficient oxidizing agent being employed in said oxidation reaction so as to substantially completely oxidize said tea tannins, and thereafter mixing the resulting solution of oxidized tea tannins with the clarified stripped tea extract and said condensed volatile aromatics, and drying the resultant mixture to provide a powdered tea extract.

7. A process according to claim 6 in which said stripped aqueous tea extract is concentrated before chilling.

8. A process according to claim 6 in which the resulting solution of oxidized tea tannins is mixed with the clarified stripped tea extract and the resulting mixture is concentrated before mixing with said condensed volatile aromatics.

9. A process according to claim 6 in which said separated tannins are subjected to a first oxidation reaction by means of an oxidizing agent selected from the group consisting of oxygen and an oxygen containing gas, and to a second oxidation reaction by means of an oxidizing agent selected from the group consisting of ozone, an ozone containing gas, and hydrogen peroxide.

10. In the process of treating tea to produce a cold water soluble powdered tea extract wherein an initial aqueous tea extract is prepared from tea leaves and chilled to precipitate a portion of the tea tannins contained therein to thus form a clarified extract, the improvement which comprises the steps of preparing an initial aqueous tea extract having a solids content of 2 to 20%; chilling said extract in order to precipitate a portion of the tea tannins contained in said extract; centrifuging said chilled extract in order to obtain a centrifuge cake containing 10 to 20% of solid tea tannins; heating said separated tannins to a temperature of substantially 75 to 85° C. and adding thereto alkali, this alkali addition being 25 to 50% of the total alkali amount used in the process; oxidizing said tea tannins in an oxidation column at a temperature of substantially 75 to 90° C. with oxygen while maintaining a pH value of substantially 5.5 to 7.0 by further addition of alkali, the amount of added oxygen being 30 to 120 standard liters per kilogram of tannin solids; adding hydrogen peroxide to the resulting solution of oxidized tea tannins and cooling the mixture to substantially 70 to 80° C.; bleaching said oxidized tea tannins by passing said mixture through a bleaching column in which said mixture is held during a period between 10 minutes and 2 hours at an over-pressure comprised between 0 and 6.5 atmospheres; concentrating the resulting mixture and mixing the resulting concentrate with the clarified concentrate obtained earlier from the centrifuge operation; and drying the resulting mixture to provide a powdered tea extract.

11. A process according to claim 10 in which the alkali is sodium hydroxide.

12. A process according to claim 10 in which the alkali is potassium hydroxide.

13. A process according to claim 10 in which the bleaching operation is accomplished in the same column as used for the oxidation reaction.

14. In the process of treating tea to produce a cold water soluble powdered tea extract wherein an initial aqueous tea extract is prepared from tea leaves, and chilled to precipitate a portion of the tea tannins contained in said extract to thus form a clarified extract, the improvement which comprises the steps of preparing an initial aqueous tea extract haivng a solids content of 2 to 20%; chilling said extract in order to precipitate a portion of the tea tannins contained in said extract; centrifuging said chilled extract in order to obtain a centrifuge cake containing 10 to 20% of solid tea tannins; oxidizing said tannins in an autoclave-type reactor provided with an agitator by heating them to substantially 70 to 105° C., adjusting the pH value to 5.5 to 7.5 by addition of sodium hydroxide, admitting oxygen to said autoclave when the pH reaches the optimum of substantially 6.5, pressuring to an overpressure of 2.0 to 14 atmospheres, maintaining the reaction by addition of sodium hydroxide in a total amount of 8.5 to 9.5% based on fed solids so as to maintain a pH value of 5.5 to 7.5, the total reaction time being between 10 minutes and 3 hours; bleaching the solubilized tannins in an autoclave-type reactor in the presence of 10 to 22% hydrogen peroxide based on fed solids, at a temperature of 40 to 105° C. and under an overpressure of 2.0 to 14 atmospheres; agitating the hydrogen peroxide tannin mixture during a period sufficient to dissipate the excess of hydrogen peroxide; concentrating the resulting mixture and mixing the resulting concentrate with the clarified concentrate obtained earlier from the centrifuge operation; and drying the resulting mixture to provide a powdered tea extract.

15. A process according to claim 14 in which the pH value of the mixture resulting from the bleaching reaction is adjusted to 5.0 to 5.2 by addition of acetic acid.

16. A process according to claim 14 in which both the oxidation and the bleaching reaction are performed continuously.

References Cited in the file of this patent

UNITED STATES PATENTS

| 2,831,772 | Herz | Apr. 22, 1958 |
|---|---|---|
| 2,863,775 | Perech | Dec. 9, 1958 |
| 2,963,368 | Greenbaum | Dec. 6, 1960 |

OTHER REFERENCES

Tea and Coffee Trade Journal, May 1960, pp. 22, 68 and 75.